(12) United States Patent
Hou et al.

(10) Patent No.: US 9,053,378 B1
(45) Date of Patent: Jun. 9, 2015

(54) LASER BARCODE SCANNER

(71) Applicant: Hand Held Products, Inc., Fort Mill, SC (US)

(72) Inventors: Rui Hou, Suzhou (CN); Gyan Zhang, Suzhou (CN); Hao Xu, Suzhou (CN); Yuwen Zhou, Suzhou (CN); Stephen Colavito, Garnet Valley, PA (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

(21) Appl. No.: 14/154,207

(22) Filed: Jan. 14, 2014

(30) Foreign Application Priority Data

Dec. 12, 2013  (CN) .......................... 2013 2 0813885

(51) Int. Cl.
*G06K 7/10* (2006.01)
(52) U.S. Cl.
CPC ........ *G06K 7/10564* (2013.01); *G06K 7/10594* (2013.01)
(58) Field of Classification Search
USPC .......................................................... 235/454
See application file for complete search history.

(56) References Cited

U.S. PATENT DOCUMENTS

| | | | |
|---|---|---|---|
| 6,832,725 B2 | 12/2004 | Gardiner et al. | |
| 7,128,266 B2 | 10/2006 | Zhu et al. | |
| 7,159,783 B2 | 1/2007 | Walczyk et al. | |
| 7,413,127 B2 | 8/2008 | Ehrhart et al. | |
| 7,726,575 B2 | 6/2010 | Wang et al. | |
| 8,228,591 B1 * | 7/2012 | Towers et al. ................. | 359/275 |
| 8,294,969 B2 | 10/2012 | Plesko | |
| 8,317,105 B2 | 11/2012 | Kotlarsky et al. | |
| 8,322,622 B2 | 12/2012 | Liu | |
| 8,366,005 B2 | 2/2013 | Kotlarsky et al. | |
| 8,371,507 B2 | 2/2013 | Haggerty et al. | |
| 8,376,233 B2 | 2/2013 | Van Horn et al. | |
| 8,381,979 B2 | 2/2013 | Franz | |
| 8,390,909 B2 | 3/2013 | Plesko | |
| 8,408,464 B2 | 4/2013 | Zhu et al. | |
| 8,408,468 B2 | 4/2013 | Horn et al. | |
| 8,408,469 B2 | 4/2013 | Good | |
| 8,424,768 B2 | 4/2013 | Rueblinger et al. | |
| 8,448,863 B2 | 5/2013 | Xian et al. | |

(Continued)

FOREIGN PATENT DOCUMENTS

| | | |
|---|---|---|
| WO | 2013163789 A1 | 11/2013 |
| WO | 2013173985 A1 | 11/2013 |
| WO | 2014019130 A1 | 2/2014 |

OTHER PUBLICATIONS

U.S. Appl. No. 14/274,858 for Mobile Printer With Optional Battery Accessory, filed May 12, 2014, (Marty et al.), 26 pages.

(Continued)

*Primary Examiner* — Jamara Franklin
(74) *Attorney, Agent, or Firm* — Additon, Higgins & Pendleton, P.A.

(57) ABSTRACT

The present laser barcode scanner employs (i) a simplified scan mechanism made from a semi-flexible substrate that eliminates complicated optical assemblies, (ii) a layout with location features eliminating the need for special alignment, and (iii) a layout with all surface mounted devices on a single layer eliminating the need for extra soldering. Together these strategies, when used with a method of mitigating stray-light by separating light paths with a circuit board, combine to achieve a laser barcode scanner of unique simplicity and performance.

19 Claims, 5 Drawing Sheets

(56) References Cited

U.S. PATENT DOCUMENTS

| | | |
|---|---|---|
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 2007/0063048 A1 | 3/2007 | Havens et al. |
| 2008/0185432 A1 | 8/2008 | Caballero et al. |
| 2009/0134221 A1 | 5/2009 | Zhu et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0169999 A1 | 7/2011 | Grunow et al. |
| 2011/0202554 A1 | 8/2011 | Powilleit et al. |
| 2012/0111946 A1 | 5/2012 | Golant |
| 2012/0138685 A1 | 6/2012 | Qu et al. |
| 2012/0168511 A1 | 7/2012 | Kotlarsky et al. |
| 2012/0168512 A1 | 7/2012 | Kotlarsky et al. |
| 2012/0193407 A1 | 8/2012 | Barten |
| 2012/0193423 A1 | 8/2012 | Samek |
| 2012/0203647 A1 | 8/2012 | Smith |
| 2012/0223141 A1 | 9/2012 | Good et al. |
| 2012/0228382 A1 | 9/2012 | Havens et al. |
| 2012/0248188 A1 | 10/2012 | Kearney |
| 2013/0043312 A1 | 2/2013 | Van Horn |
| 2013/0056285 A1 | 3/2013 | Meagher |
| 2013/0070322 A1 | 3/2013 | Fritz et al. |
| 2013/0075168 A1 | 3/2013 | Amundsen et al. |
| 2013/0082104 A1 | 4/2013 | Kearney et al. |
| 2013/0175341 A1 | 7/2013 | Kearney et al. |
| 2013/0175343 A1 | 7/2013 | Good |
| 2013/0200158 A1 | 8/2013 | Feng et al. |
| 2013/0214048 A1 | 8/2013 | Wilz |
| 2013/0256418 A1 | 10/2013 | Havens et al. |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0278425 A1 | 10/2013 | Cunningham et al. |
| 2013/0287258 A1 | 10/2013 | Kearney |
| 2013/0292474 A1 | 11/2013 | Xian et al. |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306730 A1 | 11/2013 | Brady et al. |
| 2013/0306731 A1 | 11/2013 | Pedraro |
| 2013/0306734 A1 | 11/2013 | Xian et al. |
| 2013/0307964 A1 | 11/2013 | Bremer et al. |
| 2013/0308625 A1 | 11/2013 | Corcoran |
| 2013/0313324 A1 | 11/2013 | Koziol et al. |
| 2013/0313325 A1 | 11/2013 | Wilz et al. |
| 2013/0313326 A1 | 11/2013 | Ehrhart |
| 2013/0327834 A1 | 12/2013 | Hennick et al. |
| 2013/0341399 A1 | 12/2013 | Xian et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008430 A1 | 1/2014 | Soule et al. |
| 2014/0008439 A1 | 1/2014 | Wang |
| 2014/0021256 A1 | 1/2014 | Qu et al. |
| 2014/0025584 A1 | 1/2014 | Liu et al. |
| 2014/0027518 A1 | 1/2014 | Edmonds et al. |
| 2014/0034723 A1 | 2/2014 | Van Horn et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061305 A1 | 3/2014 | Nahill et al. |
| 2014/0061306 A1 | 3/2014 | Wu et al. |
| 2014/0061307 A1 | 3/2014 | Wang et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0075846 A1 | 3/2014 | Woodburn |
| 2014/0076974 A1 | 3/2014 | Havens et al. |
| 2014/0078341 A1 | 3/2014 | Havens et al. |

(56) References Cited

U.S. PATENT DOCUMENTS

| | | |
|---|---|---|
| 2014/0078342 A1 | 3/2014 | Li et al. |
| 2014/0078345 A1 | 3/2014 | Showering |
| 2014/0084068 A1 | 3/2014 | Gillet et al. |
| 2014/0086348 A1 | 3/2014 | Peake et al. |
| 2014/0097249 A1 | 4/2014 | Gomez et al. |
| 2014/0098284 A1 | 4/2014 | Oberpriller et al. |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Li et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0121438 A1 | 5/2014 | Kearney |
| 2014/0121445 A1 | 5/2014 | Ding et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131441 A1 | 5/2014 | Nahill et al. |
| 2014/0133379 A1 | 5/2014 | Wang et al. |
| 2014/0140585 A1 | 5/2014 | Wang |
| 2014/0151453 A1 | 6/2014 | Meier et al. |
| 2014/0160329 A1 | 6/2014 | Ren et al. |

OTHER PUBLICATIONS

U.S. Appl. No. 14/264,173 for Autofocus Lens System for Indicia Readers filed Apr. 29, 2014, (Ackley et al.), 39 pages.

U.S. Appl. No. 14/230,322 for Focus Module and Components with Actuator filed Mar. 31, 2014 (Feng et al.); 92 pages.

U.S. Appl. No. 14/222,994 for Method and Apparatus for Reading Optical Indicia Using a Plurality of Data filed Mar. 24, 2014 (Smith et al.); 30 pages.

U.S. Appl. No. 14/231,898 for Hand-Mounted Indicia-Reading Device with Finger Motion Triggering filed Apr. 1, 2014 (Van Horn et al.); 36 pages.

U.S. Appl. No. 29/486,759 for an Imaging Terminal, filed Apr. 2, 2014 (Oberpriller et al.); 8 pages.

U.S. Appl. No. 29/436,337 for an Electronic Device, filed Nov. 5, 2012 (Fitch et al.); 19 pages.

U.S. Appl. No. 29/458,405 for an Electronic Device, filed Jun. 19, 2013 (Fitch et al.); 22 pages.

U.S. Appl. No. 29/459,620 for an Electronic Device Enclosure, filed Jul. 2, 2013 (London et al.); 21 pages.

U.S. Appl. No. 29/459,681 for an Electronic Device Enclosure, filed Jul. 2, 2013 (Chaney et al.); 14 pages.

U.S. Appl. No. 29/459,785 for a Scanner and Charging Base, filed Jul. 3, 2013 (Fitch et al.); 21 pages.

U.S. Appl. No. 29/459,823 for a Scanner, filed Jul. 3, 2013 (Zhou et al.); 13 pages.

U.S. Appl. No. 29/468,118 for an Electronic Device Case, filed Sep. 26, 2013 (Oberpriller et al.); 44 pages.

First Office Action in CN Application No. 201320813885.8, Priority Application to Current Application, dated Apr. 28, 2014, English Translation provided, 4 pages.

U.S. Appl. No. 13/367,978, filed Feb. 7, 2012, (Feng et al.); now abandoned.

U.S. Appl. No. 13/736,139 for an Electronic Device Enclosure, filed Jan. 8, 2013 (Chaney); 40 pages.

U.S. Appl. No. 13/771,508 for an Optical Redirection Adapter, filed Feb. 20, 2013 (Anderson); 26 pages.

U.S. Appl. No. 13/780,356 for a Mobile Device Having Object Identification Interface, filed Feb. 28, 2013 (Samek et al.); 21 pages.

U.S. Appl. No. 13/852,097 for a System and Method for Capturing and Preserving Vehicle Event Data, filed Mar. 28, 2013 (Barker et al.); 20 pages.

U.S. Appl. No. 13/902,110 for a System and Method for Display of Information Using a Vehicle-Mount Computer, filed May 24, 2013 (Hollifield); 29 pages.

U.S. Appl. No. 13/902,144, for a System and Method for Display of Information Using a Vehicle-Mount Computer, filed May 24, 2013 (Chamberlin); 23 pages.

U.S. Appl. No. 13/902,242 for a System for Providing a Continuous Communication Link With a Symbol Reading Device, filed May 24, 2013 (Smith et al.); 24 pages.

U.S. Appl. No. 13/912,262 for a Method of Error Correction for 3D Imaging Device, filed Jun. 7, 2013 (Jovanovski et al.); 33 pages.

U.S. Appl. No. 13/912,702 for a System and Method for Reading Code Symbols at Long Range Using Source Power Control, filed Jun. 7, 2013 (Xian et al.); 24 pages.

U.S. Appl. No. 13/922,339 for a System and Method for Reading Code Symbols Using a Variable Field of View, filed Jun. 20, 2013 (Xian et al.); 23 pages.

U.S. Appl. No. 13/927,398 for a Code Symbol Reading System Having Adaptive Autofocus, filed Jun. 26, 2013 (Todeschini); 24 pages.

U.S. Appl. No. 13/930,913 for a Mobile Device Having an Improved User Interface for Reading Code Symbols, filed Jun. 28, 2013 (Gelay et al.); 24 pages.

U.S. Appl. No. 13/933,415 for an Electronic Device Case, filed Jul. 2, 2013 (London et al.); 47 pages.

U.S. Appl. No. 13/947,296 for a System and Method for Selectively Reading Code Symbols, filed Jul. 22, 2013 (Rueblinger et al.); 29 pages.

U.S. Appl. No. 13/950,544 for a Code Symbol Reading System Having Adjustable Object Detection, filed Jul. 25, 2013 (Jiang); 28 pages.

U.S. Appl. No. 13/961,408 for a Method for Manufacturing Laser Scanners, filed Aug. 7, 2013 (Saber et al.); 26 pages.

U.S. Appl. No. 14/018,729 for a Method for Operating a Laser Scanner, filed Sep. 5, 2013 (Feng et al.); 24 pages.

U.S. Appl. No. 14/019,616 for a Device Having Light Source to Reduce Surface Pathogens, filed Sep. 6, 2013 (Todeschini); 23 pages.

U.S. Appl. No. 14/023,762 for a Handheld Indicia Reader Having Locking Endcap, filed Sep. 11, 2013 (Gannon); 31 pages.

U.S. Appl. No. 14/035,474 for Augmented-Reality Signature Capture, filed Sep. 24, 2013 (Todeschini); 33 pages.

U.S. Appl. No. 14/047,896 for Terminal Having Illumination and Exposure Control filed Oct. 7, 2013 (Jovanovski et al.); 32 pages.

U.S. Appl. No. 14/053,175 for Imaging Apparatus Having Imaging Assembly, filed Oct. 14, 2013 (Barber); 39 pages.

U.S. Appl. No. 14/055,234 for Dimensioning System, filed Oct. 16, 2013 (Fletcher); 26 pages.

U.S. Appl. No. 14/053,314 for Indicia Reader, filed Oct. 14, 2013 (Huck); 29 pages.

U.S. Appl. No. 14/065,768 for Hybrid System and Method for Reading Indicia, filed Oct. 29, 2013 (Meier et al.); 22 pages.

U.S. Appl. No. 14/074,746 for Self-Checkout Shopping System, filed Nov. 8, 2013 (Hejl et al.); 26 pages.

U.S. Appl. No. 14/074,787 for Method and System for Configuring Mobile Devices via NFC Technology, filed Nov. 8, 2013 (Smith et al.); 28 pages.

U.S. Appl. No. 14/087,190 for Optimal Range Indicators for Bar Code Validation, filed Nov. 22, 2013 (Hejl); 27 pages.

U.S. Appl. No. 14/345,735 for Optical Indicia Reading Terminal with Combined Illumination filed Mar. 19, 2014 (Ouyang); 19 pages.

U.S. Appl. No. 14/101,965 for High Dynamic-Range Indicia Reading System, filed Dec. 10, 2013 (Xian); 28 pages.

U.S. Appl. No. 14/118,400 for Indicia Decoding Device with Security Lock, filed Nov. 18, 2013 (Liu); 28 pages.

U.S. Appl. No. 14/150,393 for Incicia-reader Having Unitary Construction Scanner, filed Jan. 8, 2014 (Colavito et al.); 28 pages.

U.S. Appl. No. 14/154,207 for Laser Barcode Scanner, filed Jan. 14, 2014 (Hou et al.); 26 pages.

(56) References Cited

OTHER PUBLICATIONS

U.S. Appl. No. 14/154,915 for Laser Scanning Module Employing a Laser Scanning Assembly having Elastomeric Wheel Hinges, filed Jan. 14, 2014 (Havens et al.); 24 pages.

U.S. Appl. No. 14/158,126 for Methods and Apparatus to Change a Feature Set on Data Collection Devices, filed Jan. 17, 2014 (Berthiaume et al.); 53 pages.

U.S. Appl. No. 14/342,551 for Terminal Having Image Data Format Conversion filed Mar. 4, 2014 (Lui et al.); 25 pages.

U.S. Appl. No. 14/342,544 for Imaging Based Barcode Scanner Engine with Multiple Elements Supported on a Common Printed Circuit Board filed Mar. 4, 2014 (Liu et al.); 27 pages.

U.S. Appl. No. 14/257,174 for Reading Apparatus Having Partial Frame Operating Mode filed Apr. 21, 2014, (Barber et al.), 67 pages.

U.S. Appl. No. 14/200,405 for Indicia Reader for Size-Limited Applications filed Mar. 7, 2014 (Feng et al.); 42 pages.

U.S. Appl. No. 14/166,103 for Indicia Reading Terminal Including Optical Filter filed Jan. 28, 2014 (Lu et al.); 29 pages.

\* cited by examiner

LASER BARCODE SCANNER

CROSS-REFERENCE TO RELATED APPLICATION

The present application claims the benefit of Chinese Application No. 201320813885.8 filed Dec. 12, 2013 at the State Intellectual Property Office of the People's Republic of China. The foregoing patent application is hereby incorporated by reference in its entirety.

FIELD OF THE INVENTION

The present invention relates to indicia readers, such as laser barcode scanners.

BACKGROUND

Over the past few decades, the use of code symbol readers, such as barcode scanners, has dramatically increased. Businesses have particularly gravitated toward the use of code symbol readers in the inventory management and point-of-sale contexts. Scanning barcode readers are particularly popular because of their long and adjustable working distances.

Traditional scanner designs are limited by complexity constraints. Such designs may require time consuming alignment of complicated folded optical paths to mitigate stray light and ensure proper performance. Multiple circuit boards are commonly used and connected with flexible circuits, each adding to the cost and assembly time.

Thus, a need exists for a laser barcode scanner solution that uses a variety of techniques to simplify the design, to achieve good performance, and to remain cost-effective to produce.

SUMMARY

Accordingly, in one aspect, the invention embraces a system for reading indicia, such as barcodes. The indicia-reading system includes an indicia-capturing subsystem for optically acquiring information about indicia within the indicia-capturing subsystem's field of view. An indicia-decoding subsystem is configured for decoding the indicia information acquired by the indicia-capturing subsystem, and an interface subsystem translates this information into a communication protocol and communicates with a peripheral host device (e.g., an external computer).

The indicia-capturing subsystem itself includes a transmission module (e.g., a transmission subsystem), which transmits electromagnetic radiation, and a reception module (e.g., a reception subsystem), which collects and detects the electromagnetic radiation reflected or scattered from the indicia.

More particularly, the indicia-capturing subsystem may include one circuit board (i.e., exactly one, two-sided circuit board) that itself includes (i) a light source for projecting electromagnetic radiation (e.g., laser light) toward indicia, (ii) a light-deflecting assembly for scanning the radiation, and (iii) a photodiode or other sensor for collecting the electromagnetic radiation reflected from the indicia (e.g., reflected laser light).

The light source and the photodiode are typically positioned on the circuit board such that the electromagnetic radiation projected from the light source to the indicia and the electromagnetic radiation reflected from the indicia to the photodiode may trace different paths (i.e., "non-retro"). For instance, the light source may be positioned on the first side of the circuit board and the photodiode may be positioned on a second side of the circuit board.

In another aspect, the invention embraces a method for reading indicia (e.g., employing the foregoing system). In this regard, the method employs a non-retro electromagnetic-radiation path to facilitate the selective mitigation of stray light.

The foregoing illustrative summary, as well as other exemplary objectives and/or advantages of the invention, and the manner in which the same are accomplished, are further explained within the following detailed description and its accompanying drawings.

DETAILED DESCRIPTION

As noted, the present invention embraces a system and associated method for reading indicia.

Figure 1:
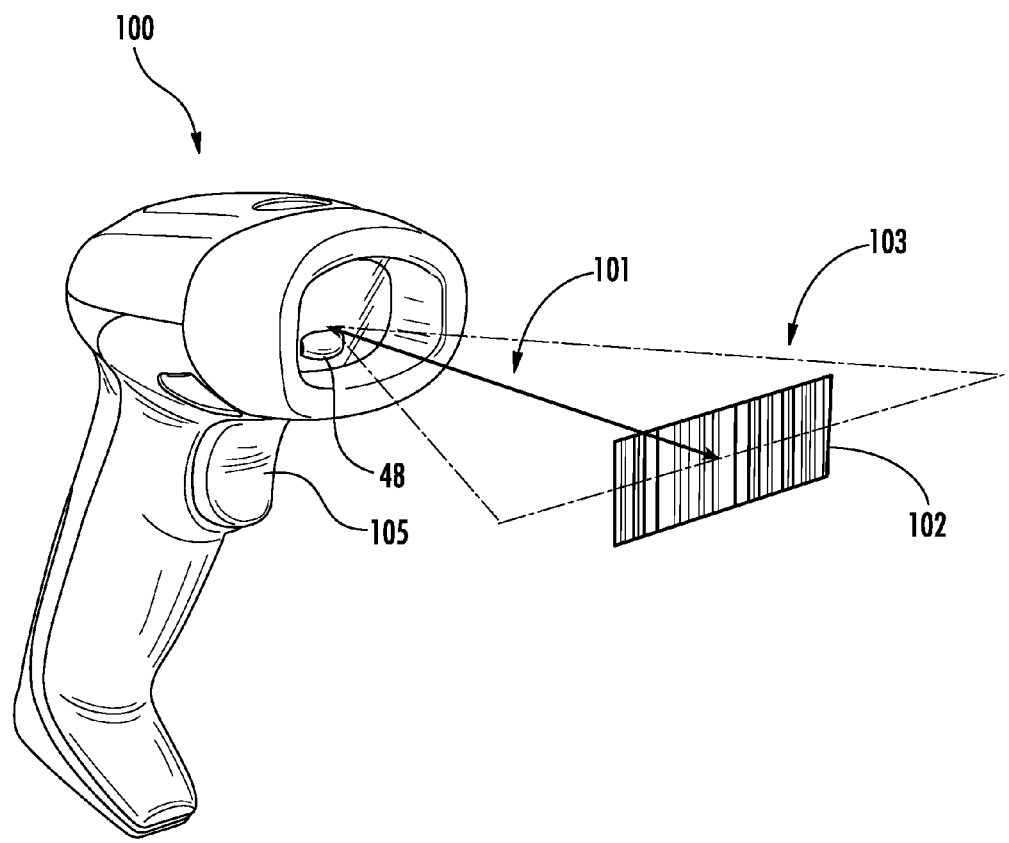
FIG. 1 depicts an exemplary handheld indicia reader according to the present invention.

The system, which typically is embodied in a simplified handheld indicia reader (e.g., laser scanner or scanner) 100 as depicted in FIG. 1, facilitates the reading of indicia 102, such as barcodes, QR codes, matrix codes, or other computer-readable indicia.

Figure 2:
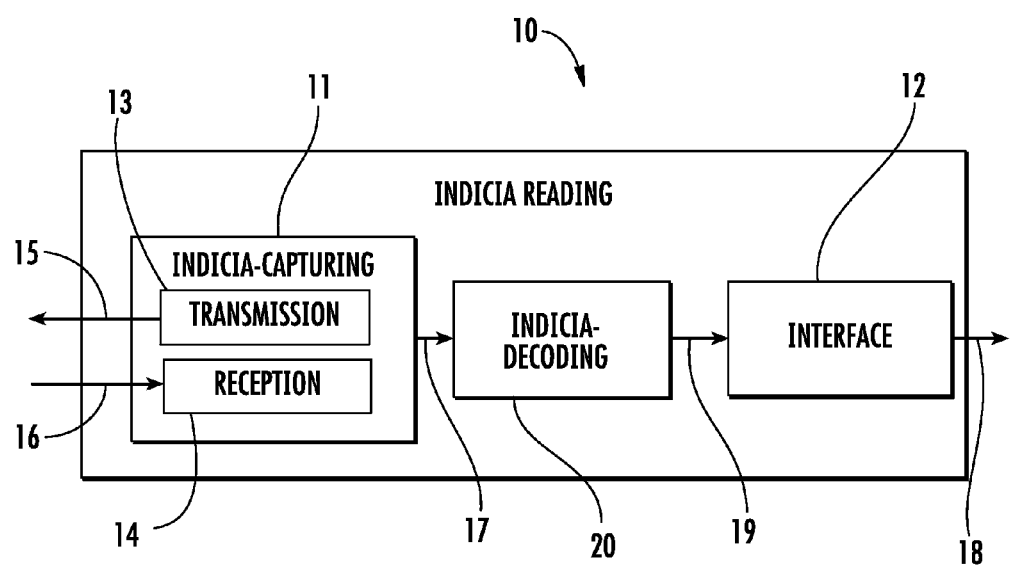
FIG. 2 depicts a block diagram showing the indicia reader's primary subsystems.

As depicted in FIG. 2, the indicia reading system 10 includes an indicia-capturing subsystem 11 for acquiring optical information about indicia. The indicia-capturing subsystem 11 includes a transmission module 13 and reception module 14. The transmission module 13 is responsible for scanning the electromagnetic radiation 15 (e.g., light from a visible laser diode or VLD 31) back and forth across the indicia 102 while the reception module 14 collects and detects the reflected radiation 16 and converts it into an analog, electronic signal 17. This analog signal is input into the indicia-decoding subsystem 20. There, the analog signal is processed and converted into a digital signal 19, which is then sent to the interface subsystem 12. The interface subsystem 12 communicates the decoded indicia information to the output 18 via a communication protocol (e.g., USB).

Figure 3:
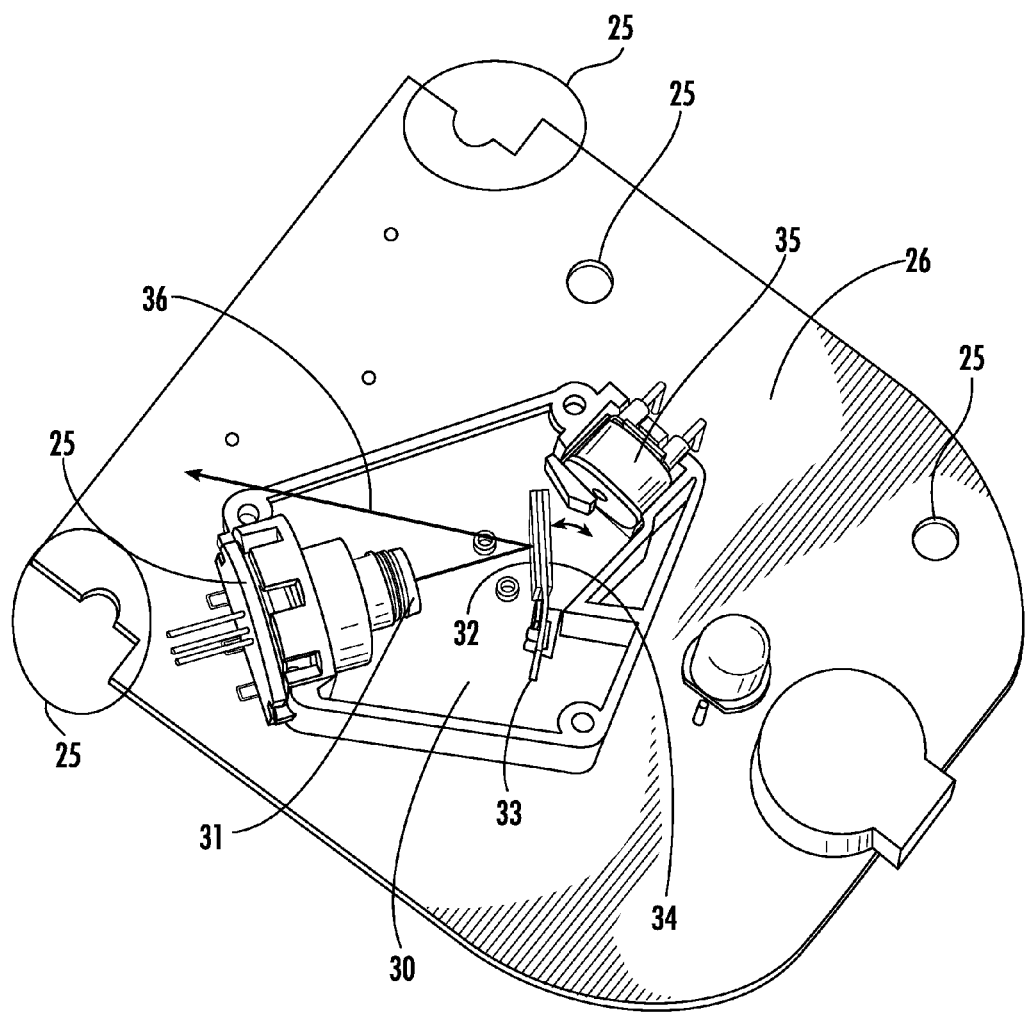
FIG. 3 depicts a first (top) side of an exemplary circuit board, illustrating the transmission module of the indicia-capturing subsystem.
Figure 4:
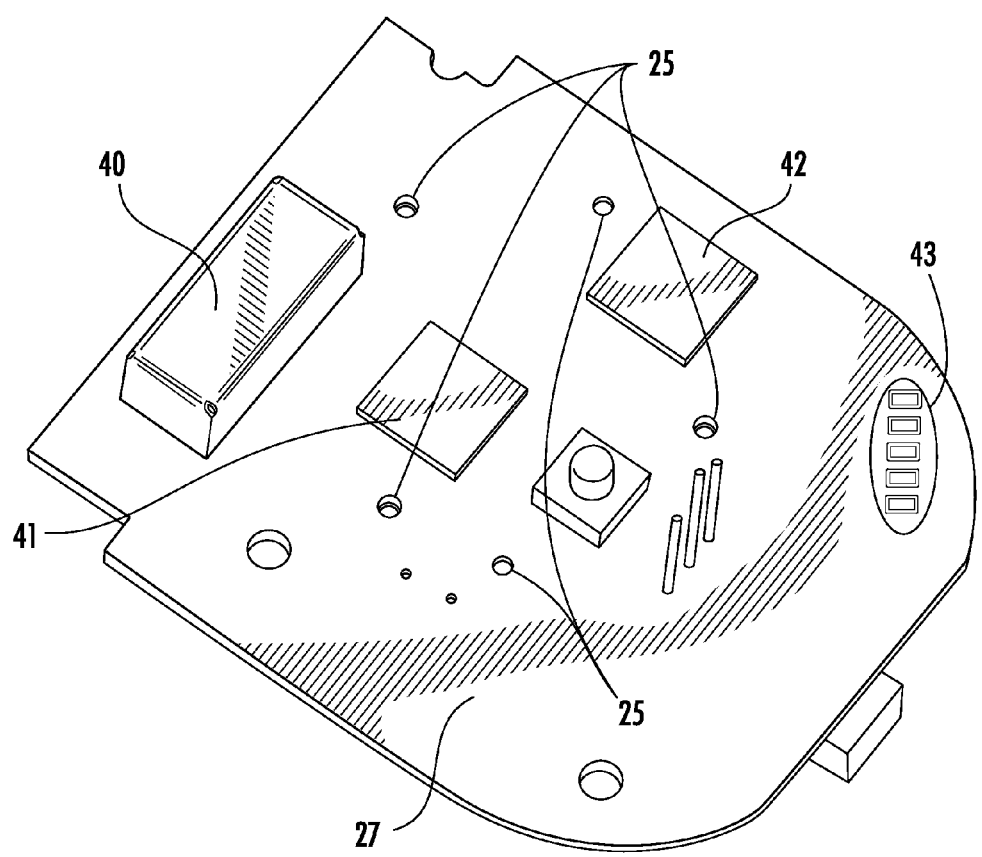
FIG. 4 depicts a second (bottom) side of an exemplary circuit board, illustrating the reception module of the indicia-capturing subsystem.

FIG. 3 and FIG. 4 depict opposite sides of an exemplary circuit board. FIG. 3 illustrates the indicia-capturing subsystem's transmission module. FIG. 4 illustrates the indicia-capturing subsystem's reception module, as well as the surface mounted parts that include the indicia-decoding and the interface subsystems.

Referring to the top side of the circuit board 26 in FIG. 3, the details of the transmission module 13 are shown. The indicia-capturing subsystem's transmission module is assembled on an optic holder 30, which contains a VLD 31, a scanning mirror ("flipper mirror") 32, and a coil 35. Assembling these items onto a single holder 30 allows for easy assembly, robust alignment, and simple repair. Light from the VLD 31 is focused at a set working distance 101 from the scanner along a folded imaging path 36. The flipper mirror 32 scans the light to sweep an angular range 103.

In other words, the light-deflecting assembly includes a hinged mirror 32 (i.e., the flipper mirror), a magnet 34, and a coil 35. The flipper mirror 32 is affixed to one side of a flexible substrate 33 (e.g., a copper-clad polyimide sheet) with a magnet 34 affixed to the opposite side of the flexible substrate 33. The flexible substrate 33 is clamped to the optic holder 30 at one edge so that it is free to move about this hinged edge. The magnet 34 affixed opposite the mirror 32 interacts with the coil's magnetic field in such a way as to reciprocate the mirror 32 (i.e., actuate the flipper mirror 32 back and forth) about the hinged edge. The coil's magnetic field is produced by driving the coil 35 with an alternating electric current. Typically, the frequency of this alternating signal is adjusted to be near the mechanical resonance of the flipper mirror 32 in order to minimize the current amplitude necessary for sufficient scanning.

The laser scanner 100 includes location features (e.g., location holes) that facilitate permanent alignment of the indicia-capturing subsystem. Such location features, along with the optic holder module 30, secure the light source 31 (e.g., a laser diode) and the light-deflecting assembly to facilitate permanent alignment of the indicia-capturing subsystem (e.g., the mechanical tolerances are selected to maintain alignment suitable for scanning operations). There is no need for additional alignment of these subassemblies. This optic holder 30 is affixed to the top side of the circuit board 26 so that the emitted light is transmitted through the top half of scanner window 46 and onto the barcode 102 at the proper working distance 101. The laser scanner includes a collimator lens for projecting the emitted laser light with a nearly constant spot-size over a range of distances, including the working distance 101. The size of the light spot at the working distance depends on the particular application, but the light spot should, in general, be smaller than either a bar or space of the barcode in order to prevent reading errors. The light source 31, which should operate at wavelength suitable for efficient detection, should be situated in the pass-band of any reception-module filtering.

When the laser scanner's trigger 105 is pressed, transmitted light 15 is scanned across its scanning range 103. During a scan the transmitted light 15 encounters a barcode 102 and the reflected light 16 is directed back toward the indicia reader 10. The reflected signal's amplitude is modulated because of the different reflectivities of the barcode along the scanned direction. The barcode's light areas reflect more light than do the barcode's dark areas. Thus, the modulation of the reflected light 16 represents the barcode's coded information. The reception module gathers this reflected light 16 and converts it into an electronic signal suitable for decoding.

Figure 5:
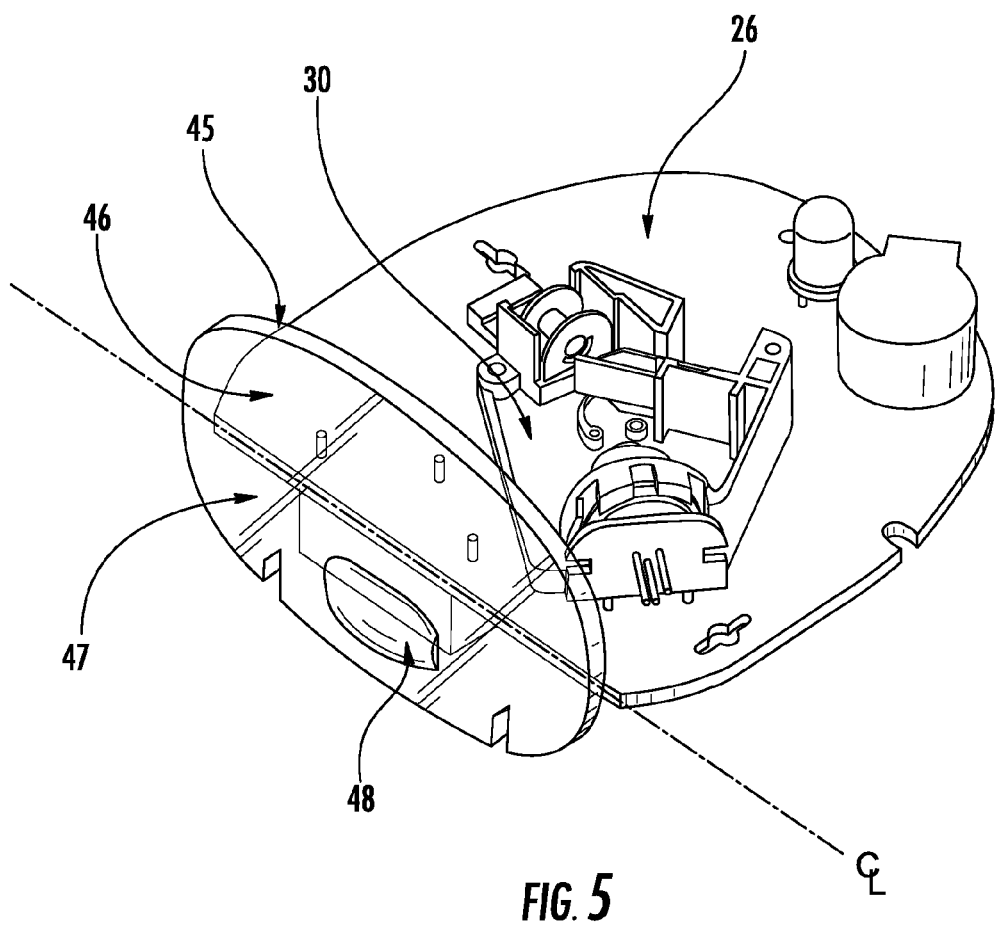
FIG. 5 depicts the positioning of the window associated with an exemplary circuit board.

Referring to FIG. 4, the reception module (e.g., a reception subsystem or reception circuit) is located on the bottom side of the circuit board 27. Reflected light 16 is filtered and focused by the integrated lens 48 in the bottom half of the scanner window 47 adjacent to the bottom side of the board, as shown in FIG. 5. The transmitted and received laser light beams thus trace different paths through this window 45. As such, the system is called "non-retro" (e.g., non-retroreflective) to indicate this configuration. The non-retro aspect of this design facilitates its simplicity and helps mitigate stray light. The integrated lens simplifies construction and does not need alignment other than from the scanner housing.

Satisfactory detection of the reflected light requires that any stray light from the sun, room-lights, or other light sources be minimized. The scanner window is colored so that the transmitted and received laser light may pass with little loss while light of different wavelengths (i.e., colors) is minimized. Additional filtering may be required to supplement this window filtering in cases where the window filter's suppression is insufficient (e.g., IR filtering in daylight applications). To minimize size and cost, this additional filtering can be integrated with the photodiode detector 40.

The lens, which is situated in front of the detector 40, collects the modulated light and focuses it onto the detector (e.g., a silicon photodiode) 40. As noted, the detector 40 is located on circuit board opposite the transmission module. In this architecture, the board serves to baffle unmodulated light from the transmission module, which might otherwise leak into the detector. Thus, the non-retro design is an efficient, elegant way to minimize the harmful effects of stray light.

After the light is detected by the photodiode 40, the converted electronic analog signal 17 is sent to the first element of the indicia-decoding subsystem, the application specific integrated circuit (i.e., ASIC) 41. Here, the electronic analog signal is processed to detect modulation. The configurable ASIC 41 performs various functions and has inputs and outputs to drive and monitor other subsystems but is primarily responsible for processing and converting the received signals from the photodiode. The ASIC chip 41 consolidates what would be a large amount of circuitry into a single surface-mounted package, thereby significantly reducing size. The ASIC chip 41 is soldered on the underside of the circuit board 27 along with all the other surface mounted parts. In general, all of the surface-mounted devices are positioned on the underside of the circuit board and no surface-mounted devices are positioned on the top side of the circuit board. By soldering all of the surface mounted parts on one side of the circuit board, the manufacturing complexity is simplified and made more cost effective.

After processing the raw electronic signal, the ASIC returns a digital signal representing the indicia code 19. This digital signal is then fed to the microcontroller unit (i.e., the MCU) 42. The MCU contains a processor core, memory, and programmable input/output peripherals. This unit may be programmed with different codes or different communication protocols. Its job is to verify the digital signal represents a known code, to decode the signal into the information that the barcode represents, and to communicate this data to the output of the indicia-reading system 18 via a communication protocol (e.g., USB). A USB cable may be soldered directly to the laser scanner board via the USB solder pads 43 located on the bottom side of the board 27. Alternatively, to ease manufacturing, a connector may be used instead of solder pads.

Thus, the laser barcode scanner solution presented here represents a compact, simple, inexpensive laser scanner that is easy to assemble. A single, two-layer board (i.e., top and bottom) is used. Only one solder reflow run is necessary, and parts such as cables and extra mechanical holders are eliminated. The desired optical paths are aligned by assembly and require no additional alignment (e.g., zero alignment), despite using a flipper mirror assembly made from a flexible substrate. The scan mechanism and the collection subsystems are located on opposite sides of the circuit board to improve performance without adding complexity.

To supplement the present disclosure, this application incorporates entirely by reference the following patents, patent application publications, and patent applications: U.S. Pat. No. 6,832,725; U.S. Pat. No. 7,128,266; U.S. Pat. No. 7,159,783; U.S. Pat. No. 7,413,127; U.S. Pat. No. 7,726,575; U.S. Pat. No. 8,294,969; U.S. Pat. No. 8,317,105; U.S. Pat. No. 8,322,622; U.S. Pat. No. 8,366,005; U.S. Pat. No. 8,371,507; U.S. Pat. No. 8,376,233; U.S. Pat. No. 8,381,979; U.S. Pat. No. 8,390,909; U.S. Pat. No. 8,408,464; U.S. Pat. No. 8,408,468; U.S. Pat. No. 8,408,469; U.S. Pat. No. 8,424,768; U.S. Pat. No. 8,448,863; U.S. Pat. No. 8,457,013; U.S. Pat.

No. 8,459,557; U.S. Pat. No. 8,469,272; U.S. Pat. No. 8,474, 712; U.S. Pat. No. 8,479,992; U.S. Pat. No. 8,490,877; U.S. Pat. No. 8,517,271; U.S. Pat. No. 8,523,076; U.S. Pat. No. 8,528,819; U.S. Pat. No. 8,544,737; U.S. Pat. No. 8,548,242; U.S. Pat. No. 8,548,420; U.S. Pat. No. 8,550,335; U.S. Pat. No. 8,550,354; U.S. Pat. No. 8,550,357; U.S. Pat. No. 8,556, 174; U.S. Pat. No. 8,556,176; U.S. Pat. No. 8,556,177; U.S. Pat. No. 8,559,767; U.S. Pat. No. 8,559,957; U.S. Pat. No. 8,561,895; U.S. Pat. No. 8,561,903; U.S. Pat. No. 8,561,905; U.S. Pat. No. 8,565,107; U.S. Pat. No. 8,571,307; U.S. Pat. No. 8,579,200; U.S. Pat. No. 8,583,924; U.S. Pat. No. 8,584, 945; U.S. Pat. No. 8,587,595; U.S. Pat. No. 8,587,697; U.S. Pat. No. 8,588,869; U.S. Pat. No. 8,590,789; U.S. Pat. No. 8,593,539; U.S. Pat. No. 8,596,542; U.S. Pat. No. 8,596,543; U.S. Pat. No. 8,599,271; U.S. Pat. No. 8,600,158; U.S. Pat. No. 8,600,167; U.S. Patent Application Publication No. 2009/0134221; U.S. Patent Application Publication No. 2010/0177080; U.S. Patent Application Publication No. 2010/0177076; U.S. Patent Application Publication No. 2010/0177707; U.S. Patent Application Publication No. 2010/0177749; U.S. Patent Application Publication No. 2010/0225757; U.S. Patent Application Publication No. 2011/0169999; U.S. Patent Application Publication No. 2012/0111946; U.S. Patent Application Publication No. 2012/0168511; U.S. Patent Application Publication No. 2012/0168512; U.S. Patent Application Publication No. 2012/0193407; U.S. Patent Application Publication No. 2012/0193423; U.S. Patent Application Publication No. 2012/0203647; U.S. Patent Application Publication No. 2012/0223141; U.S. Patent Application Publication No. 2012/0228382; U.S. Patent Application Publication No. 2012/0248188; U.S. Patent Application Publication No. 2013/0043312; U.S. Patent Application Publication No. 2013/0056285; U.S. Patent Application Publication No. 2013/0068840; U.S. Patent Application Publication No. 2013/0070322; U.S. Patent Application Publication No. 2013/0075168; U.S. Patent Application Publication No. 2013/0082104; U.S. Patent Application Publication No. 2013/0175343; U.S. Patent Application Publication No. 2013/0256418; U.S. Patent Application Publication No. 2013/0270346; U.S. Patent Application Publication No. 2013/0278425; U.S. Patent Application Publication No. 2013/0284801; U.S. Patent Application Publication No. 2013/0287258; U.S. Patent Application Publication No. 2013/0292474; U.S. Patent Application Publication No. 2013/0292475; U.S. patent application Ser. No. 13/347,193 for a Hybrid-Type Bioptical Laser Scanning And Digital Imaging System Employing Digital Imager With Field Of View Overlapping Field Of Field Of Laser Scanning Subsystem, filed Jan. 10, 2012 (Kearney et al.); U.S. patent application Ser. No. 13/367,047 for Laser Scanning Modules Embodying Silicone Scan Element With Torsional Hinges, filed Feb. 6, 2012 (Feng et al.); U.S. patent application Ser. No. 13/367,978 for a Laser Scanning Module Employing An Elastomeric U-Hinge Based Laser Scanning Assembly, filed Feb. 7, 2012 (Feng et al.); U.S. patent application Ser. No. 13/400,748 for a Laser Scanning Bar Code Symbol Reading System Having Intelligent Scan Sweep Angle Adjustment Capabilities Over The Working Range Of The System For Optimized Bar Code Symbol Reading Performance, filed Feb. 21, 2012 (Wilz); U.S. patent application Ser. No. 13/471, 973 for Terminals and Methods for Dimensioning Objects, filed May 15, 2012; U.S. patent application Ser. No. 13/492, 883 for a Laser Scanning Module With Rotatably Adjustable Laser Scanning Assembly, filed Jun. 10, 2012 (Hennick et al.); U.S. patent application Ser. No. 13/736,139 for an Electronic Device Enclosure, filed Jan. 8, 2013 (Chaney); U.S. patent application Ser. No. 13/750,304 for Measuring Object Dimensions Using Mobile Computer, filed Jan. 25, 2013; U.S. patent application Ser. No. 13/771,508 for an Optical Redirection Adapter, filed Feb. 20, 2013 (Anderson); U.S. patent application Ser. No. 13/780,158 for a Distraction Avoidance System, filed Feb. 28, 2013 (Sauerwein); U.S. patent application Ser. No. 13/780,196 for Android Bound Service Camera Initialization, filed Feb. 28, 2013 (Todeschini et al.); U.S. patent application Ser. No. 13/780,271 for a Vehicle Computer System with Transparent Display, filed Feb. 28, 2013 (Fitch et al.); U.S. patent application Ser. No. 13/780,356 for a Mobile Device Having Object-Identification Interface, filed Feb. 28, 2013 (Samek et al.); U.S. patent application Ser. No. 13/784,933 for an Integrated Dimensioning and Weighing System, filed Mar. 5, 2013 (McCloskey et al.); U.S. patent application Ser. No. 13/785,177 for a Dimensioning System, filed Mar. 5, 2013 (McCloskey et al.); U.S. patent application Ser. No. 13/792,322 for a Replaceable Connector, filed Mar. 11, 2013 (Skvoretz); U.S. patent application Ser. No. 13/852,097 for a System and Method for Capturing and Preserving Vehicle Event Data, filed Mar. 28, 2013 (Barker et al.); U.S. patent application Ser. No. 13/885, 218 for a Indicia Encoding System with Integrated Purchase and Payment Information, filed Oct. 6, 2013 (Liu et al.); U.S. patent application Ser. No. 13/895,616 for a Laser Scanning Code Symbol Reading System Employing Multi-Channel Scan Data Signal Processing with Synchronized Digital Gain Control (SDGC) for Full Range Scanning, filed May 16, 2013 (Xian et al.); U.S. patent application Ser. No. 13/895,846 for a Method of Programming a Symbol Reading System, filed Apr. 10, 2013 (Corcoran); U.S. patent application Ser. No. 13/897,512 for a Laser Scanning Code Symbol Reading System Providing Improved Control over the Length and Intensity Characteristics of a Laser Scan Line Projected Therefrom Using Laser Source Blanking Control, filed May 20, 2013 (Brady et al.); U.S. patent application Ser. No. 13/897,634 for a Laser Scanning Code Symbol Reading System Employing Programmable Decode Time-Window Filtering, filed May 20, 2013 (Wilz, Sr. et al.); U.S. patent application Ser. No. 13/902,110 for a System and Method for Display of Information Using a Vehicle-Mount Computer, filed May 24, 2013 (Hollifield); U.S. patent application Ser. No. 13/902,144, for a System and Method for Display of Information Using a Vehicle-Mount Computer, filed May 24, 2013 (Chamberlin); U.S. patent application Ser. No. 13/902,242 for a System For Providing A Continuous Communication Link With A Symbol Reading Device, filed May 24, 2013 (Smith et al.); U.S. patent application Ser. No. 13/912,262 for a Method of Error Correction for 3D Imaging Device, filed Jun. 7, 2013 (Jovanovski et al.); U.S. patent application Ser. No. 13/912,702 for a System and Method for Reading Code Symbols at Long Range Using Source Power Control, filed Jun. 7, 2013 (Xian et al.); U.S. patent application Ser. No. 13/922,339 for a System and Method for Reading Code Symbols Using a Variable Field of View, filed Jun. 20, 2013 (Xian et al.); U.S. patent application Ser. No. 13/927,398 for a Code Symbol Reading System Having Adaptive Autofocus, filed Jun. 26, 2013 (Todeschini); U.S. patent application Ser. No. 13/930, 913 for a Mobile Device Having an Improved User Interface for Reading Code Symbols, filed Jun. 28, 2013 (Gelay et al.); U.S. patent application Ser. No. 13/933,415 for an Electronic Device Case, filed Jul. 2, 2013 (London et al.); U.S. patent application Ser. No. 13/947,296 for a System and Method for Selectively Reading Code Symbols, filed Jul. 22, 2013 (Rueblinger et al.); U.S. patent application Ser. No. 13/950,544 for a Code Symbol Reading System Having Adjustable Object Detection, filed Jul. 25, 2013 (Jiang); U.S. patent application Ser. No. 13/961,408 for a Method for Manufacturing Laser Scanners, filed Aug. 7, 2013 (Saber et al.); U.S. patent application Ser. No. 13/973,315 for a Symbol Reading System Having Predictive Diagnostics, filed Aug. 22, 2013 (Nahill et al.); U.S. patent application Ser. No. 13/973,354 for a Pairing Method for Wireless Scanner via RFID, filed Aug. 22, 2013 (Wu et al.); U.S. patent application Ser. No. 13/974,374 for Authenticating Parcel Consignees with Indicia Decoding Devices, filed Aug. 23, 2013 (Ye et al.); U.S. patent application Ser. No. 14/018,729 for a Method for Operating a Laser Scanner, filed Sep. 5, 2013 (Feng et al.); U.S. patent application Ser. No. 14/019,616 for a Device Having Light Source to Reduce Surface Pathogens, filed Sep. 6, 2013 (Todeschini); U.S. patent application Ser. No. 14/023,762 for a Handheld Indicia Reader Having Locking Endcap, filed Sep. 11, 2013 (Gannon); and U.S. patent application Ser. No. 14/035,474 for Augmented-Reality Signature Capture, filed Sep. 24, 2013 (Todeschini); U.S. patent application Ser. No. 14/058,721 for a Terminal Configurable for Use Within an Unknown Regulatory Domain, filed Oct. 21, 2013 (Pease et al.); U.S. patent application Ser. No. 14/035,474 for Augmented-Reality Signature Capture, filed Sep. 24, 2013 (Todeschini); U.S. patent application Ser. No. 14/050,515 for Hybrid-Type Bioptical, filed Oct. 10, 2013 (Edmonds et al.); U.S. patent application Ser. No. 14/055,234 for Dimensioning System, filed Oct. 16, 2013 (Fletcher); U.S. patent application Ser. No. 14/055,353 for Dimensioning System, filed Oct. 16, 2013 (Giordano et al.); U.S. patent application Ser. No. 14/050,675 for Apparatus for Displaying Bar Codes from Light Emitting Display Surfaces, filed Oct. 10, 2013 (Horn et al.); U.S. patent application Ser. No. 14/053,314 for Indicia Reader, filed Oct. 14, 2013 (Huck); U.S. patent application Ser. No. 14/058,762 for Terminal Including Imaging Assembly, filed Oct. 21, 2013 (Gomez et al.); U.S. patent application Ser. No. 14/058,831 for System Operative to Adaptively Select an Image Sensor for Decodable Indicia Reading, filed Oct. 21, 2013 (Sauerwein); U.S. patent application Ser. No. 14/062,239 for Chip on Board Based Highly Integrated Imager, filed Oct. 24, 2013 (Toa et al.); U.S. patent application Ser. No. 14/065,768 for Hybrid System and Method for Reading Indicia, filed Oct. 29, 2013 (Meier et al.); U.S. patent application Ser. No. 14/074,746 for Self-Checkout Shopping System, filed Nov. 8, 2013 (Hejl et al.) U.S. patent application Ser. No. 14/074,787 for Method and System for Configuring Mobile Devices via NFC Technology, filed Nov. 8, 2013 (Smith et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A laser scanner, comprising:
an indicia-capturing subsystem for acquiring information about indicia within the indicia-capturing subsystem's field of view, the indicia-capturing subsystem including exactly one circuit board (i) a light source for projecting electromagnetic radiation toward indicia, (ii) a light-deflecting assembly, and (iii) a photodiode for collecting electromagnetic radiation reflected from the indicia, wherein the light source and the photodiode are positioned on the circuit board such that the electromagnetic radiation projected from the light source to the indicia and the electromagnetic radiation reflected from the indicia to the photodiode are non-retroreflective; and
an indicia-decoding subsystem configured for decoding indicia information acquired by the indicia-capturing subsystem.

2. The laser scanner according to claim 1, comprising a lens for converging electromagnetic radiation reflected from the indicia onto the photodiode.

3. The laser scanner according to claim 1, comprising a light filter for filtering unwanted electromagnetic radiation reflected from the indicia onto the photodiode.

4. The laser scanner according to claim 1, comprising an interface subsystem configured for (i) translating the indicia information decoded by the indicia-decoding subsystem into a communication protocol and (ii) communicating with a host device.

5. The laser scanner according to claim 1, comprising surface-mounted devices secured to the circuit board, wherein all of the surface-mounted devices are positioned on the second side of the circuit board and no surface-mounted devices are positioned on the first side of the circuit board.

6. The laser scanner according to claim 1, wherein the indicia-capturing subsystem comprises (i) a transmission module for transmitting electromagnetic radiation toward indicia and (ii) a reception module for collecting and detecting the electromagnetic radiation reflected or scattered from the indicia.

7. The laser scanner according to claim 1, wherein the circuit board is configured to baffle electromagnetic radiation projected from the light source.

8. The laser scanner according to claim 1, wherein the light source and the light-deflecting assembly are secured to an optic holder, the optic holder being secured to a first side of the circuit board.

9. The laser scanner according to claim 8, wherein the light-deflecting assembly comprises (i) a flexible substrate secured at an edge to the optic holder to form a hinge, a mirror positioned on a first side of the flexible substrate, and a magnet positioned on a second side of the flexible substrate, opposite the mirror, and (ii) a coil for producing a magnetic field that interacts with the magnet so as to reciprocate the mirror positioned on the flexible substrate opposite the magnet.

10. The laser scanner according to claim 1, wherein the light source and the light-deflecting assembly are secured to a first side of the circuit board and the photodiode is secured to a second, opposite side of the circuit board.

11. The laser scanner according to claim 1, wherein the light source for projecting electromagnetic radiation is a visible laser diode (VLD).

12. The laser scanner according to claim 1, wherein the indicia-capturing subsystem is configured to acquire information about barcode symbols within the indicia-capturing subsystem's field of view.

13. The laser scanner according to claim 1, wherein the laser scanner includes location features that facilitate permanent alignment of the indicia-capturing subsystem.

14. A laser scanner, comprising:
an indicia-capturing subsystem for acquiring information about indicia within the indicia-capturing subsystem's field of view, the indicia-capturing subsystem including exactly one circuit board (i) a light source for projecting electromagnetic radiation toward indicia, (ii) a light-deflecting assembly, and (iii) a photodiode for collecting electromagnetic radiation reflected from the indicia, wherein the light source and the light-deflecting assembly are secured to an optic holder, the optic holder being secured to a first side of the circuit board, and wherein the photodiode is positioned on a second, opposite side of the circuit board to baffle stray electromagnetic radiation emitted from the light source; and an indicia-decoding subsystem configured for decoding indicia information acquired by the indicia-capturing subsystem.

15. The laser scanner according to claim 14, comprising a window that integrates a lens and light filter for converging and filtering electromagnetic radiation reflected from the indicia onto the photodiode.

16. The laser scanner according to claim 14, comprising surface-mounted devices secured to the circuit board, wherein all of the surface-mounted devices are positioned on the second side of the circuit board, whereby no surface-mounted devices are positioned on the first side of the circuit board.

17. The laser scanner according to claim 14, wherein the indicia-capturing subsystem comprises (i) a transmission module for transmitting electromagnetic radiation toward indicia and (ii) a reception module for collecting and detecting the electromagnetic radiation reflected or scattered from the indicia.

18. The laser scanner according to claim 14, wherein the light-deflecting assembly comprises (i) a flexible substrate secured at its edge to the optic holder to form a hinge, a mirror positioned on a first side of the flexible substrate, and a magnet positioned on a second side of the flexible substrate, opposite the mirror, and (ii) a coil for producing a magnetic field that interacts with the magnet so as to reciprocate the mirror positioned on the flexible substrate opposite the magnet.

19. The laser scanner according to claim 14, wherein the laser scanner includes location features to fixedly position the light source, the light-deflecting assembly, and the photodiode relative to one another to facilitate permanent alignment of the indicia-capturing subsystem.

* * * * *